June 19, 1945.  W. H. NOBLES ET AL  2,378,652
FLEXIBLE CHUTE
Filed Sept. 22, 1942  4 Sheets-Sheet 1

Inventor
Warren H. Nobles
John E. Mills
By Robert M. Dunning
Attorney

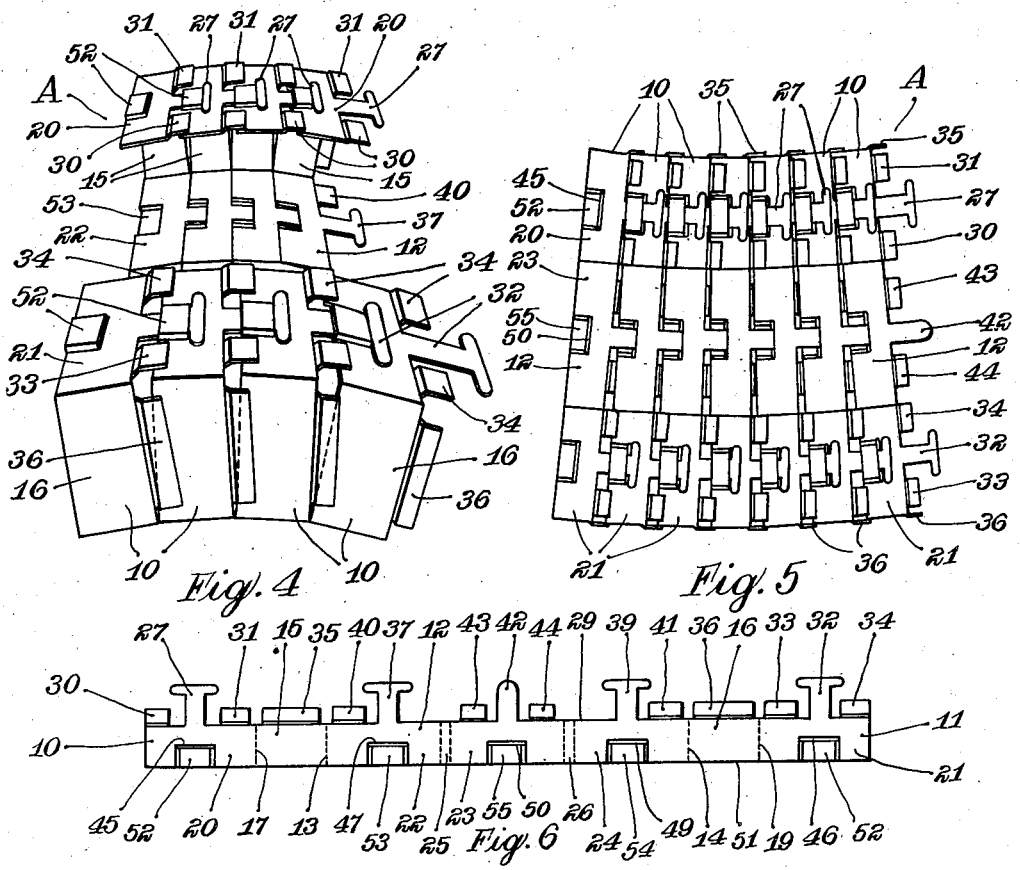
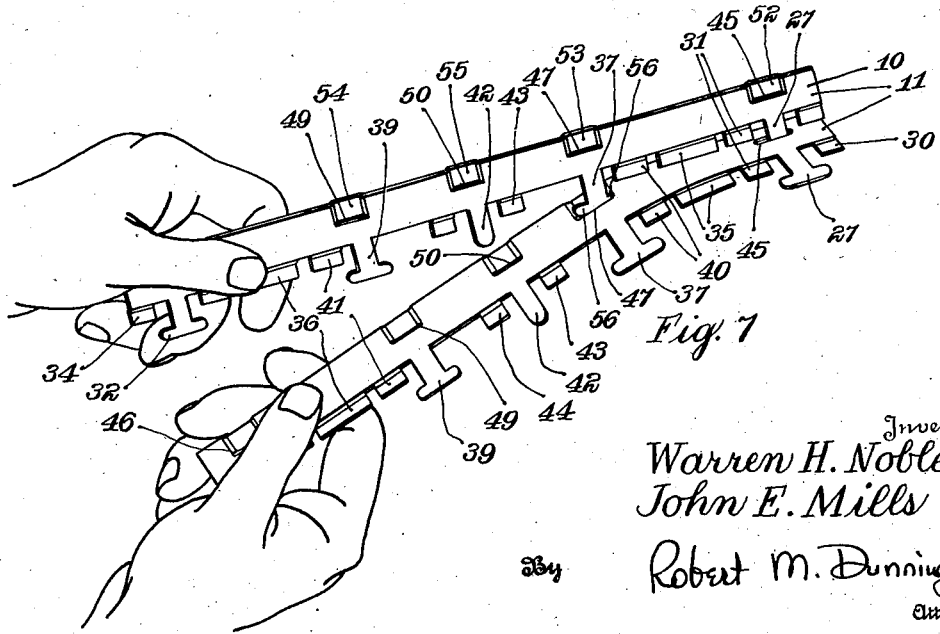

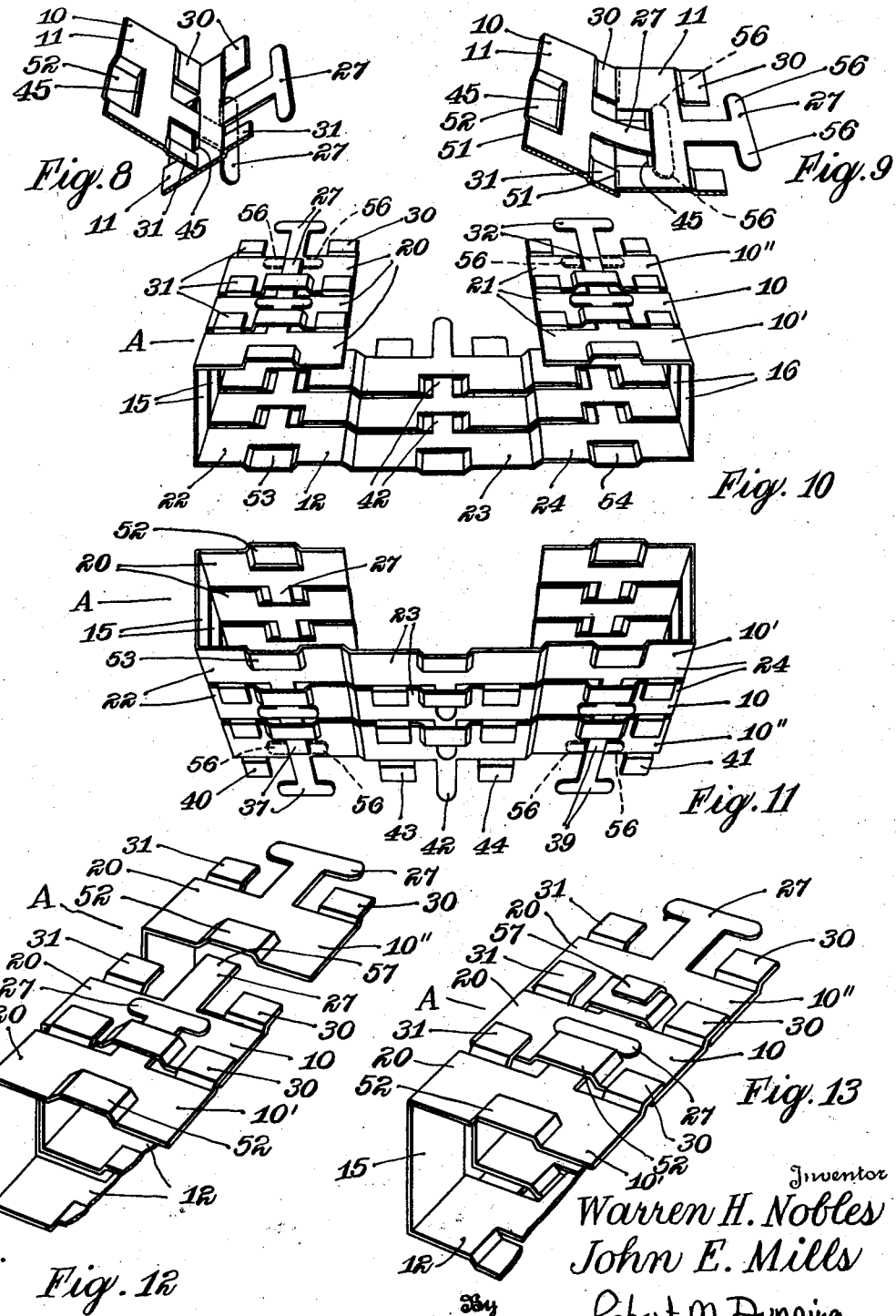

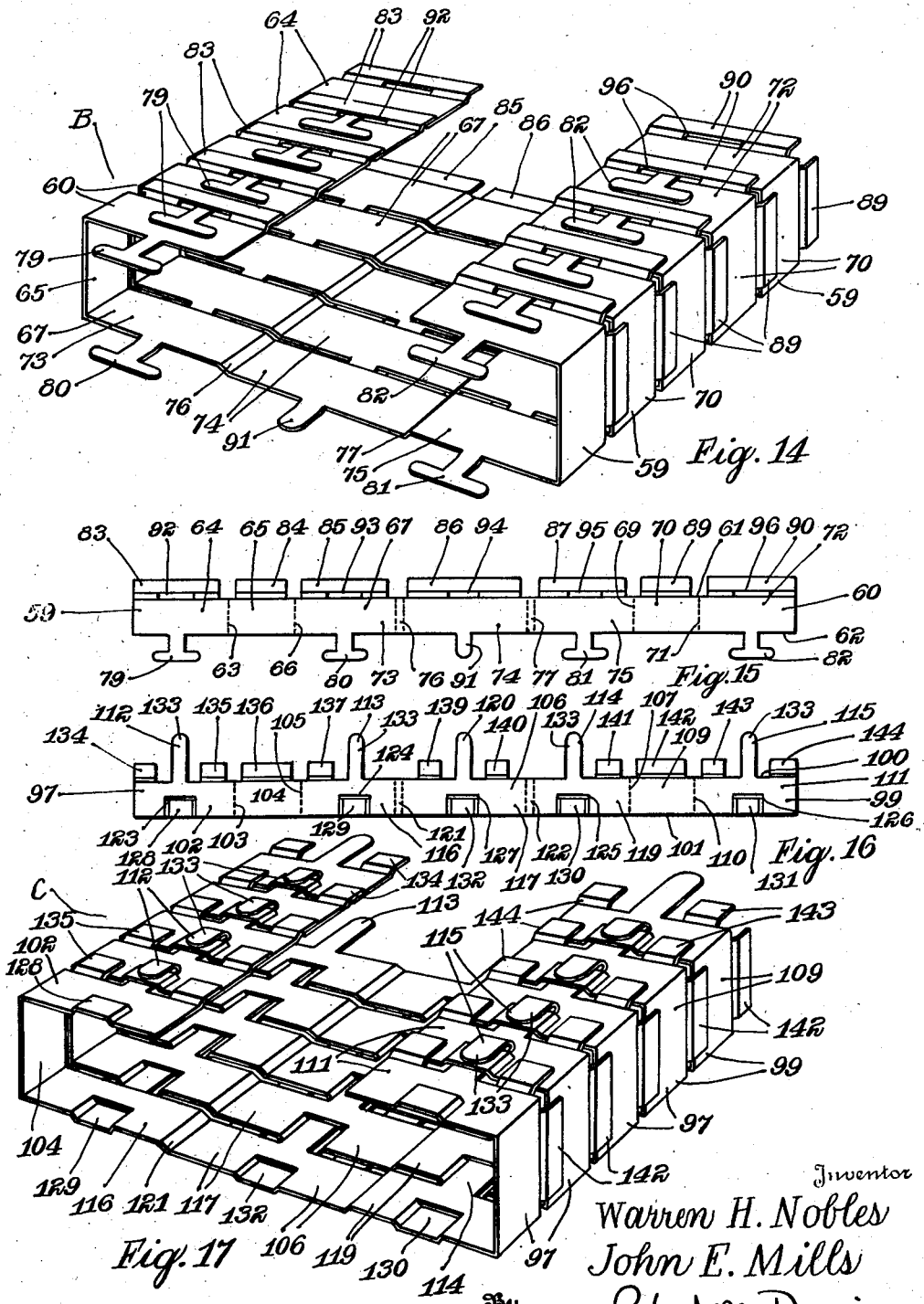

Patented June 19, 1945

2,378,652

UNITED STATES PATENT OFFICE 2,378,652

FLEXIBLE CHUTE

Warren H. Nobles and John E. Mills, St. Paul, Minn., assignors to Seeger Refrigerator Company, St. Paul, Minn., a corporation of Minnesota Application September 22, 1942, Serial No. 459,248

16 Claims. (Cl. 193—25)

Our invention relates to an improvement in flexible chutes, wherein it is desired to provide an apparatus capable of guiding or conveying articles or material from one point to another.

In certain types of apparatus it is necessary to convey articles or material from a fixed point to a movable part of the apparatus, or from one movable point to another. In such apparatus, a flexible chute element must connect the parts of the apparatus between which the articles or material must be conveyed. Flexible chutes capable of accomplishing the desired result have been previously constructed. These previous constructions, however, have been extremely costly to manufacture, and require considerable time to construct.

Flexible chutes of the type described must have certain qualities. In the first place, the chutes must present a relatively smooth and unbroken sliding surface over which the articles or material conveyed may slide. In the second place, the chutes must be capable of bending or twisting in any direction to a considerable extent. Furthermore, the chutes must be extremely strong in construction so that they will be durable and long lasting. Such chutes are particularly useful in guiding ammunition to a pivotally mounted automatic gun or the like.

It is the object of the present invention to provide a chute which is extremely simple to manufacture, which is very flexible, and which presents a smooth sliding surface to the articles or material to be conveyed. When once assembled, this chute is unusually sturdy in construction. At the same time, however, it is inexpensive to fabricate.

A feature of the present invention lies in the fact that the chute may be flexed in a vertical plane, in a horizontal plane, or may be twisted in a combination of curves, so as to connect the two points regardless of the relative position of these parts. This flexing can take place, however, without danger of the chute kinking at any point throughout its length.

It is the object of the present invention to form a flexible chute from a number of short lengths of material connected together in a manner to permit longitudinal play between each adjacent pair of chute forming sections. The chute may be channel-shaped in cross-section in the event that the articles conveyed could not escape from the chute; but in preferred form the chute is channel-shaped with inwardly extending opposed flanges at the top of the channel walls, thus forming a chute which is substantially rectangular in cross-section.

It is a feature of the present invention that longitudinal play is provided between the bases, side walls, and top flanges of adjacent chute forming sections or elements. Thus the chute may elongate or contract freely. In bending the chute in a horizontal plane, the channel sides of the individual chute forming elements on one side of the base are contracted together while the channel sides of these elements on the other side of the base are spaced apart. As a result the longitudinal axis of one chute forming element is at an angle with respect to the longitudinal axis of the next adjacent element. A series of chute forming elements may thus form a gradual bend of considerable angularity.

It is also a feature that the chute forming sections or elements may bend at a considerable angle in a vertical plane. If the channel bases of the individual sections are spread apart while the top flanges are contracted together a gradual bend of considerable angularity is formed. In a similar manner, a bend in the opposite direction may be formed by contracting together the bases of a series of the chute forming elements while the top flanges are spread apart. Twists in the chute may be formed by combining the bends on horizontal and vertical planes.

It is a feature of the present invention that the chute may be formed of a series of flat strips of sheet metal or the like, which may be stamped out in the proper configuration. Such stampings are extremely inexpensive to produce and may be quickly turned out in large quantities.

A further feature of the present invention lies in the formation of a chute of short lengths of material flexibly connected together and to interlock these sections so that they can not be accidentally disengaged. In the preferred form of our device the sections forming the chute are assembled when in flat condition, and may only be assembled in this flat relation. Subsequently the flat sections are bent into channel or box-shape. When thus bent the chute sections cannot be disengaged in the same manner in which they were assembled. Thus once the chute has been formed, the sections forming the same cannot become accidentally disengaged.

An additional feature of the present invention lies in the fact that the chute may be formed of a series of short sections, each of which includes slots through which portions of the next adjacent section may engage. In the preferred form of the invention T-shaped projecting elements on one chute section interlock in slots in the next section, and the ends of these projecting elements are longer than the slots through which they project, thus preventing accidental disengagement of the sections.

A further feature of the present invention lies in the combination of interlocking projecting elements, and offset tongues designed to extend in overlapping relation with the next adjacent chute section. The offset tongues preferably overlie the outer surface of the next adjacent chute section, while a portion of the interlocking projecting elements overlie a portion of the inner surface of the next adjacent chute section, thus holding the chute section from lateral or vertical relative movement.

An added feature of the present invention lies in the fact that while the chute sections may not become accidentally disengaged, the chute may be taken apart at any point when found necessary for replacement or repair. As a result, a section of the chute or a series of sections may be removed or replaced in an extremely short space of time, minimizing the amount of time the chute is out of use if repair or replacement of some of the sections is found necessary.

A feature of the present invention lies in the fact that flat strips may be arranged in side by side relation, and connected together in a manner to provide play between adjacent strips. A flexible belt may in this way be formed which may be used for numerous purposes. This construction is similar to the chute construction described with the exception that the strip sections are substantially flat throughout their length, rather than U-shaped or rectangularly shaped.

These and other objects and novel features of our invention will be more clearly and fully set forth in the following specification and claims.

In the drawings forming a part of our specification:

Figure 4 is a side perspective view of a small portion of the chute showing the manner in which the chute may bend in a vertical plane.

Figure 5 is a top plan view of a portion of the chute showing the manner in which the same may bend in a transverse plane.

Figure 6 is a plan view of a section of the chute before assembly thereof.

Figure 7 is a perspective view of two adjacent sections of the chute showing the manner in which these sections are assembled.

Figure 8 is a perspective sectional view through one end of two adjacent chute sections in partially assembled relation.

Figure 9 is a view similar to Figure 8, illustrating the next step in the assembly of the chute sections.

Figure 10 is a perspective view of a short section of chute showing the manner in which the chute may be taken apart at any point.

Figure 11 is a bottom perspective view of the chute section shown in Figure 10, showing this chute section in readiness for disassembly.

Figure 12 is a perspective view of a portion of the chute after disassembly thereof.

Figure 13 is a perspective view similar to Figure 12 showing the reassembly of the chute after the same has been disassembled.

Figure 14 is a perspective view of a modified form of chute construction.

Figure 15 is a top plan view of one of the sections forming the chute shown in Figure 14.

Figure 16 is a plan view of a modified form of chute section.

Figure 17 is a perspective view of a chute section showing the manner in which the sections shown in Figure 16 may be assembled.

Figures 1, 2, 3:
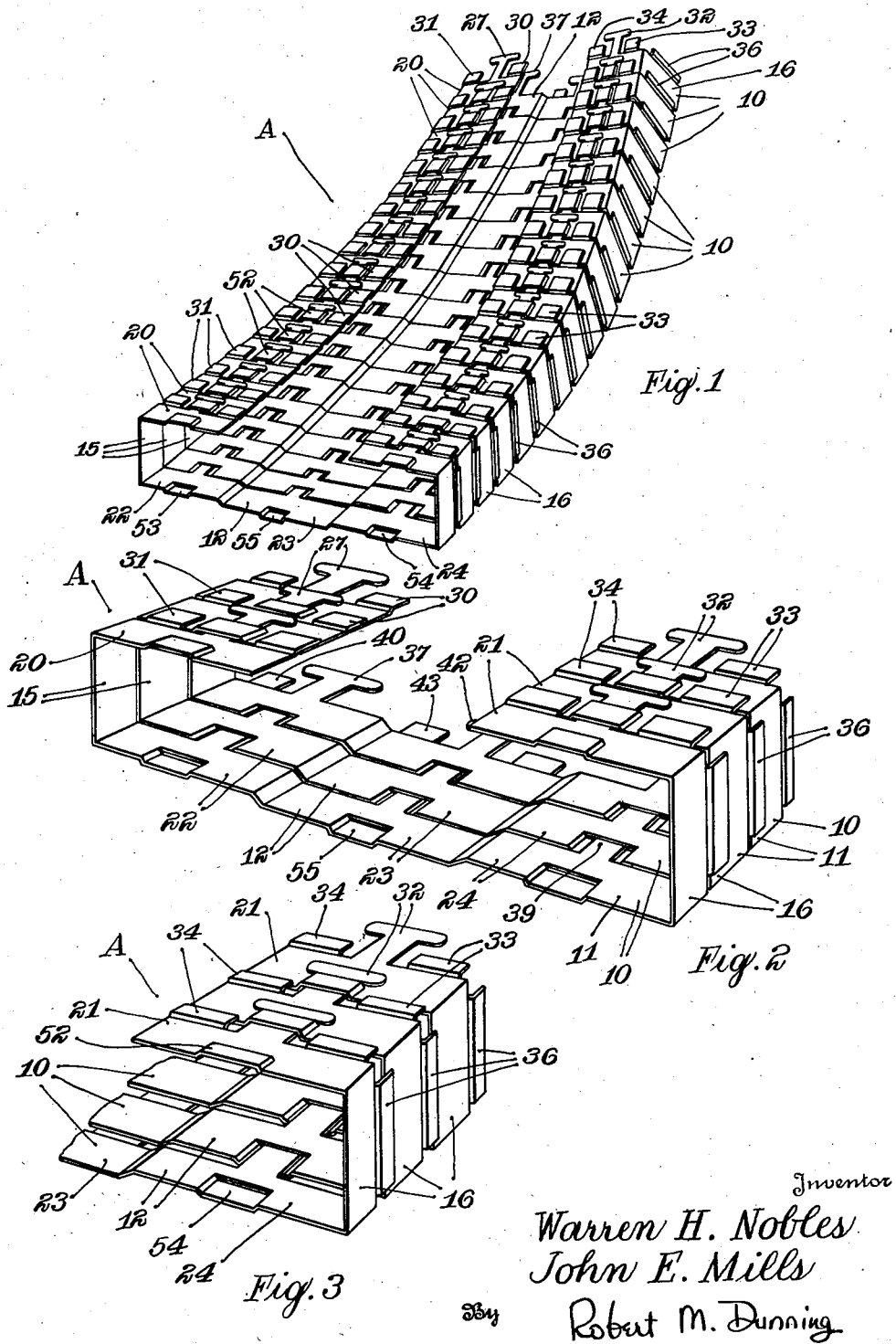
Figure 1 is a perspective view of our flexible chute showing a section of the same bent and twisted.
Figure 2 is a perspective view of a short length of the chute, showing the sections forming the same in closely assembled position.
Figure 3 is a perspective view of a portion of the chute shown in Figure 2, the sections forming the chute being spread apart into open position.

The chute A, illustrated in Figures 1 through 13 of the drawings, is constructed of a series of sections 10 which are interlocked together in such a manner that longitudinal play between the individual sections is provided. Each section 10 is preferably formed as best illustrated in Figure 6 of the drawings. The strip 11 is, in completed form, folded into channel-shaped formation with inwardly extending opposed flanges forming the top of the chute. The area 12 between the fold lines 13 and 14 forms the base of the channel. The areas 15 and 16 between the fold lines 13 and 17 and the fold lines 14 and 19, respectively, form the side walls of the channel. The area 20 between the fold line 17 and one end of the strip 11 forms one inwardly projecting flange. The area 21 between the fold line 19 and the other end of the strip 11 forms the other inwardly projecting flange.

The area 12 forming the base of the channel is divided into three portions 22, 23, and 24 connected by offsets 25 and 26. The purpose of this arrangement is to recess the central portion 23 of the base below the side sections 22 and 24 in order to decrease the area of the sliding surface over which the articles or material conveyed will contact. Obviously the entire base 12 may extend on the same plane if it is so desired, but the friction upon the elements conveyed will be slightly increased.

The flange portion 20 is provided with a substantially T-shaped interlocking element 27 projecting from one edge 29 of the strip 11. A pair of ears 30 and 31 project from the edge 29 on either side of the T-shaped projecting element 27.

A T-shaped element 32 projects from the edge 29 of the strip 11 in the flange area 21, and a pair of projecting ears 33 and 34 also project from the edge 29 of this area 21 on opposite sides of the projecting element 32.

The side walls 15 and 16 are provided with elongated ears 35 and 36 respectively, projecting from the edge 29. These ears 35 and 36 preferably extend the greater portion of the lengths of the sides 15 and 16.

The portions 22 and 24 of the base 12 are provided with T-shaped interlocking elements 37 and 39 respectively, projecting from the edge 29 of the strip 11. Ears 40 and 41 also preferably project from the edge 29 between the interlocking elements 37 and 39 and the adjacent ends of the base 12.

Centrally positioned in the central portion 23 of the base 12, we provide a locking tongue 42 and a pair of ears 43 and 44, all of which project from the edge 29 of the strip 11. All of the ears have interlocking members described or designed to extend in overlapping relation with the next adjacent section 10.

A series of slots are provided in the strip 11 through which the interlocking elements of the next adjacent section may extend. A slot 45 is provided in alignment with the interlocking element 27 on the flange portion 20. A similar slot 46 is provided in alignment with the interlocking element 32 of the flange portion 21. Slots 47 and 49 are provided in alignment with the interlocking elements 37 and 39 on the base portions 22 and 24 of the base 12. A slot 50 is provided in the strip 11 in alignment with the projecting tongue 42.

The interlocking elements 27, 32, 37, and 39, and the projecting tongue 42 are designed to extend substantially on the plane of the strip 11. Accordingly to properly interlock with the next adjacent section, offset loops are provided between each of the slots in the strip 11 and the edge 51 of the strip 11 opposite to the edge 29. The offset loop 52 which is bent downwardly below the surface of the strip 11, as viewed in Figure 6, is provided between the slot 45 and the edge 51. Similar offset loops 52, 53, 54, and 55 are provided between the strip edge 51 and the slots 46, 47, 49, and 50, respectively.

The body portions 11 of the adjacent sections 10 are designed to be in substantial alignment. Accordingly in order to overlap the next adjacent section 10, the ears 30, 31, 33, 34, 35, 36, 40, 41, 43, and 44 are all offset below the surface of the strip 11 as viewed in Figure 6. The amount of offset of these ears is substantially the thickness of the material forming the individual sections so that the ears of one section will engage against the outer surface of the next adjacent section.

With reference now to Figure 7 of the drawings, the manner of assembling the individual sections 10 will be described. Beginning at either end of the strips the interlocking elements 27, 32, 37, and 39 are threaded through their corresponding slots 45, 46, 47 and 49 of the next adjacent section. In assembling these sections, it will be noted that the section added must be bent slightly in order to assemble the sections as the cross members of the T-shaped projecting elements are longer than the slots through which they are designed to extend. In Figure 7 it will be noted that the interlocking element 27 of one section has been inserted through the slot 45 of the next adjacent section and that the interlocking element 37 is being inserted through its corresponding slot 47 in the section being attached. One laterally projecting end 56 of the T-shaped element 37 has already been inserted into the slot 47 and the other laterally projecting end 56 is about to be inserted, the two sections being moved laterally so that the first projecting end 56 underlies a portion of the strip 11 of the section being attached.

After the interlocking element 37 has been inserted in its slot 47 the projecting tongue 42 of the upper section shown in Figure 7 will be inserted in its corresponding slot 50. The interlocking element 39 will then be inserted in its corresponding slot 49 and the interlocking element 32 will finally be inserted through its corresponding slot 46. This assembly is simplified by the fact that the various projecting and interlocking elements are of greater length than the ears which also project from the edge 29 of each strip 11.

When the various interlocking elements have been inserted through the respective slots in the next adjacent section the ears will be first to bear against the wrong surface of the next adjacent strip 10. With reference to Figure 8 of the drawings, the tip ends of the two adjacent sections 10 are shown with the interlocking element 27 of one strip extending through the slot 45 of the next of the next adjacent strip end, the ears 30 and 31 of one strip bearing against the surface of the next adjacent strip 11. The next step of the assembly is shown in Figure 9 of the drawings. The two sections are pulled apart until the projecting ends 56 of the projecting element 27 engages the undersurface of the strip 11 adjacent the slot 45. By flexing the projecting element 27 slightly as illustrated in the drawings, the ears 30 and 31 may be inserted beneath the edge 51 of the next adjacent strip 11 as illustrated. After all of the various ears 30, 31, 33, 34, 35, 36, 40, 41, 43, and 44 have been inserted in a similar manner beneath the edge 51 of the next adjacent strip 11 the two strips may lie in the same plane in assembled relation.

After the required number of sections have been assembled together in the manner described the sections are bent in unison along the various fold lines previously described in order to form the substantially rectangular shape shown in the drawings. The sections 10 are bent at substantially right angles along the fold lines 13, 14, 17, and 19, thus forming a channel having opposed inwardly extending flanges thereupon. The central section 23 of the base 12 is offset below the plane of the sections 22 and 24 of the base 12 if desired, to reduce the friction upon articles or material sliding through the chute. If desired the edge 29 of the strip 11 may be cut inwardly between the offsets 25 and 26 so as to allow the edges of the base sections 22 and 24 to contact when the chute is bent as illustrated in Figure 4 of the drawings.

It is believed obvious that the top flanges may be omitted entirely, if no top is required upon the chute, and it is similarly obvious that the top flanges may extend into contacting relation, or substantially contacting relation if it is desired to close the top of the chute. Where the articles conveyed are of substantial width, however, it is frequently advantageous to leave the inwardly projecting flanges in spaced relationship for inspection purposes, to save material, and to relieve friction on the articles passing through the chute.

When the chute sections have been formed into the rectangular shape illustrated, it will be noted that the ears 35 and 36 on the side walls 15 and 16 overlap a portion of the side wall of the next adjacent section, forming a substantially continuous wall, which is smooth on its inner surface and broken only by the spaces between adjacent sections.

It will be noted that the ears 30 and 31 of the flange portion 20, and the ears 33 and 34 of the flange portion 21 overlie portions of the outer surface of the next adjacent section, thus holding the sections in proper relationship. At the same time, however, the projecting elements 27 and 32 extend beneath the offset loops 52 of the flange portions 20 and 21, and the end of these projecting elements overlie the outer surface of the flange portions. This construction necessitates a slight bending of the projecting portions 27 and 32, and the material forming the chute must be sufficiently resilient to permit this slight bending.

The undersurface of the flange portions 20 and 21, as illustrated in Figure 11 of the drawings, is smooth, the spaces between adjacent sections and the recesses formed by the offsetting of the loops 52 forming the only break in the surface. Obviously there are no projections extending inwardly from the undersurface of the strips 11 to catch articles or material sliding through the chute.

As best illustrated in Figure 11 of the drawings the ears 40, 41, 43, and 44 on the base portion 12 of the sections 10 underlie a portion of the undersurface of the next adjacent section 10, extending in overlapping relation with the next section. The projecting elements 37 and 39 overlie the offset loops 53 and 54, extending downwardly from the base of the channel, the heads of these projecting elements underlying the lower surface of the next adjacent section 10. As illustrated in Figures 1 and 2 of the drawings the upper surface of the base of the channel is smooth, no portions of the sections extending upwardly to catch the articles or material passing through the chute. The sliding surface formed by the portions 22 and 24 of the base 12 is broken only by the surface between adjacent sections and by the downwardly offset loops 53 and 54.

The projecting tongues 42 extend through the slots 50 of the next adjacent section 10, overlying the downwardly bent offset loops 55, the extreme ends of the tongues 42 underlying the lower surface of the central section 23 of the base 12, as best illustrated in Figure 11 of the drawings, while the ears 43 and 44 also underlie the lower surface of the central section 23 of the next adjacent section 10.

The manner in which the chute A may bend and twist is indicated in Figure 1 of the drawings. Figure 2 of the drawings shows three adjacent sections 10 compressed together so that these sections are in close relationship one with the next. Figure 3 shows these same sections spread apart to illustrate the longitudinal play between adjacent sections. The amount of play between adjacent sections is regulated by the length of the T-shaped projecting elements 27, 32, 37 and 39. It will be noted in Figure 3 of the drawings that the laterally projecting ends 56 of these projecting elements engage against the offset loops, such as 52 to limit separation between sections. It should also be noted that in the expanded condition shown in Figure 3, the various ears 33, 34, and 36 still overlap the next adjacent section to some extent.

Figure 4 of the drawings illustrates the manner in which the chute A may be bent in a vertical plane. In this position it will be noted that the flange portions 20 and 21 of the chute are separated the maximum amount possible, while the bases of these sections are compressed closely together. A bend of considerable angularity is possible when the chute is bent, as illustrated in Figure 4. At the same time, however, it should be noted that the bend is a gradual one, and that there is no possibility of a kink in the chute at any point due to the maximum angularity which may be assumed between any two adjacent sections. Obviously the chute may be bent in a vertical plane in the direction opposite to that shown in Figure 4, if the flange portions 20 and 21 of the various strips are compressed together while the bases 12 of these strips are spread apart.

Figure 5 of the drawings illustrates the manner in which the chute may flex in a horizontal plane. In this construction the side walls 15 on one side of the chute are in close contact, while the walls 16 on the other side of the chute are spread apart their maximum distance. A considerable angularity of bend may thus be provided in the chute, while at the same time there is no danger of a kink occurring in the chute due to the fact that any two adjacent sections can only determined by the length of the T-shaped projecting elements.

It will be noted that when the chute has been bent into channel form the adjacent sections can not be expanded in the same manner in which they were assembled. This is true because of the fact that bending of the individual strips must take place during the insertion or removal of the T-shaped projecting elements through their respective slots, and lateral movement between two adjacent sections must also take place in the insertion and removal of the T-shaped element through the respective slots. Accordingly when once assembled the various sections are permanently held from separation by the method of assembly used in putting the sections together. In some instances, however, it is desirable to take the chute apart in order to repair or replace a section or to lengthen the chute or shorten the same.

In order to take the chute A apart the method illustrated in Figures 10, 11, 12, and 13 is used. Let us presume that the sections 10 and 10' shown in these figures are to be separated from section 10". Obviously all of the sections are similar, but the identifying marks are provided in order to distinguish between the sections to be disconnected. In order to accomplish the desired result the ends 56 of the projecting elements 27 and 32 are cut off as illustrated in Figure 10 of the drawings, the portions of the projecting elements being shown in dotted outline. The ends 56 of the projecting elements 37 and 39 of the section 10 are also cut off as illustrated in Figure 11 of the drawings, the cut-off portions being illustrated in dotted outline in this figure. When all of the ends 56 of each of the T-shaped elements 27, 32, 37 and 39 of the section 10 have been cut off, these projecting elements are not longitudinal of the T-shaped elements so that the section 10 may be longitudinally pulled out of engagement with the section 10". As the clipping off of the ends 56 of the various T-shaped elements requires but little time, it is obvious that the sections 10 and 10" may be separated in an extremely short period of time. In order to reassemble the chute the projecting elements 27, 32, 37, and 39, the ends 56 of which have been cut off are reinserted through the offset loops 52, 52, 53, and 54, respectively, and the ends 57 of these elements are then bent over the loops as illustrated in Figure 13, thus holding the sections 10 and 10" locked together. The manner in which the sections may be taken apart and replaced is believed obvious from an observation of Figures 10, 11, 12, and 13.

The foregoing description describes merely a separation of two sections of the chute and replacement of these sections together. Obviously after separation of the sections the section 10 may be reinserted into the offset loops of any other section if a number of sections are to be added to the chute. By merely clipping off the ends 56 of the projecting elements of the end section to be added, this prepared section may be inserted into offset loops of the section 10". The bending of the ends 57 of the projecting elements over the offset loops of the next adjacent section detracts from the flexibility of the chute at the point of connection unless the sections are held apart while the ends 57 are being bent into the position shown in Figure 13. In a chute of considerable length, however, the non-flexibility between two adjacent sections is not of any great importance.

In Figures 14 and 15 of the drawings we disclose a chute B which is similar in principle to that which has been described, but which is slightly different from the chute described in actual construction. The chute B is formed of a series of sections 59, the construction of which is best illustrated in Figure 15 of the drawings. Each section 59 includes a body strip 60 having opposed edges 61 and 62. The strip 60 is designed to be bent along fold lines separating the strip into sections in the manner previously described in connection with sections 10. The fold line 63 provides an inwardly extending flange portion 64 forming a portion of the top of the chute. The portion 65 of the strip 60 between the fold lines 63 and 66 forms one side wall of the chute. The base of the chute 67 is formed between the fold lines 66 and 69. The other side wall 70 is defined by the fold lines 69 and 71. The area 72 between the fold line 71 and the other end of the strip 60 forms the top flange of the chute.

As previously described in conjunction with the chute A, the base 67 may be divided into three sections 73, 74, and 75, the central section 74 being connected to the side sections 73 and 75 by offset portions 76 and 77. The central offset portion 74 is preferably recessed below the other sections 73 and 75 so as to reduce the friction on the articles or material passing through the chute.

Projecting from the edge 62 of the strip 60, we provide substantially T-shaped projecting elements 79, 80, 81, and 82. The projecting element 79 projects from the flange area 64, the projecting element 80 extends from the section 73 of the base 67, the projecting element 81 extends from the base section 75 of the base 67, and the projecting element 82 projects from the flange portion 72 of the strip 60.

Elongated offset flanges or ears project from the edge 61 of the strip 60. Ears 83, 84, 85, 86, 87, 89 and 90 project from the strip sections 64, 65, 73, 74, 75, 70, and 72, respectively. All of these ears are offset with respect to the plane of the strip 60, and in the form shown these ears are offset below the surface of the strip.

A projecting tongue 91 extends from the edge 62 of the strip 60 in the center of the base section 74 of the strip. This projecting tongue 91, similarly to the projecting elements 79, 80, 81 and 82, offset slightly adjacent the strip 60, by direction of the offset 11 downwardly below the surface of the strip 60.

Slots 92, 93, 94, 95 and 96 extend through the ears 83, 85, 86, 87, and 90, respectively, at the point of offset of these ears from the strip 60. These slots in the order named are designed to accommodate the projecting elements 79, 80, 91, 81, and 82, respectively.

The assembly of this type of construction is somewhat simpler from that illustrated in connection with the sections 10, due to the fact that the projecting ears are on one side of the strip 60, while the projecting elements are on the opposite side thereof. In assembling the strips, it is only necessary to insert the T-shaped projecting elements 70, 80, 81 and 82 through the respective slots 92, 93, 95, and 96. This can be done in much the manner illustrated in Figure 7 of the drawings, although Figure 7 illustrates another type of construction. When assembled the sections 59 are bent into the rectangle formation illustrated in Figure 14 along the fold lines previously described, forming an assembled chute of the type illustrated in Figure 14 of the drawings.

An examination of Figure 14 will show that when the chute B is assembled the ends of the projecting elements 79, 80, 81, 82, and 91 overlie the outer surface of the next adjacent section 59. These projecting elements extend through the various slots in the ears 83, 85, 86, 87, and 90, respectively, so that a portion of each projecting member underlies a portion of its respective ear. All of the ears, however, extend in overlapping relation with the next adjacent section in extended or contracted position of the chute. A smooth inner surface is provided on the chute, broken only by the aperture between adjacent sections. The longitudinal play between the sections will permit the bending of the chute in a horizontal plane or in a vertical plane and will permit twisting of the chute in a combination of these curves.

The chute C, illustrated in Figure 17 of the drawings, is constructed through the use of a series of section forming elements 97, best illustrated in Figure 16 of the drawings. In this form of construction an elongated strip 99 is provided having opposed edges 100 and 101, the strip 99 being divided by a series of fold lines which form the strip into the rectangular shape illustrated in Figure 17 of the drawings. The flange portion 102 of the chute is formed between the fold line 103 and one end of the strip 99. The end wall 104 is divided by the fold lines 103 and 105. The base 106 of the sections is divided by the fold lines 105 and 107. The side wall 109 is formed between the fold line 107 and the fold line 110. The flange area or section 111 of the strip is between the fold line 110 and the other end of this strip.

Elongated projecting elements 112, 113, 114, and 115 extend from the edge 100 of the strip 99, these projecting elements extending from the flange section 102, the base 106, and the flange section 111. The base 106 is preferably divided into three sections 116, 117, and 119 and the projecting elements extend from the sections 116 and 119 of the base. A projecting tongue 120 is provided in the section 117 of the base which is offset from the sections 116 and 119 by offsetting portions 121 and 122.

Slots 123, 124, 125, 126, and 127 are formed in the strip 99 in alignment with projecting elements 112, 113, 114, 115, and 120 respectively. Offset loops 128, 129, 130, 131, and 132 are provided between the slots 123, 124, 125, 126, and 127 and the edge 101 of the strip 99.

The assembly of this type of construction is extremely simple, it being merely necessary to insert the projecting elements 112, 113, 114, 115, and 120 through the corresponding slots 123, 124, 125, 126, and 127 of the next adjacent section 97. After the adjacent sections have been assembled the ends 133 of the various projecting elements 112, 113, 114, and 115 may be folded back over the surface of the offset loops, as illustrated in Figure 17 of the drawings, thus connecting the various sections 97 together. In folding the ends 133, care is taken to provide sufficient play to permit relative longitudinal movement between adjacent sections of the chute.

As in the chute A, ears 134 are provided on the section 102. An ear 136 is provided on the side wall 104, an ear 137 is provided on the section 116 of the base, ears 139 and 140 are provided on the section 117 of the base, an ear 141 is provided on the section 119 of the base, an ear 142 is provided on the side wall portion 109, and ears 143 and 144 are provided on the flange section 111 of the strip 99. All of these ears are offset downwardly, as viewed in Figure 16, from the surface of the strip 99, and all of these ears project from the edge 100 of the strip. The various ears are designed to overlap the outer surface of the next adjacent section 97, thus providing a means of holding the various sections in proper relation.

We have found that the chute C will flex or twist in the same manner as the chutes A and B, and is somewhat easier than the other construction to take apart when desired. Adjacent sections 97 of the chute C may be taken apart by merely unfolding the ends 133 of the projecting members 112, 113, 114, and 115 flat, whereupon the section bearing the ears will slidably disengage the next adjacent section. This construction, however, is slightly more difficult to form due to the necessity of bending the projecting elements after the chute sections are assembled.

In accordance with the patent statutes, we have described the principles of construction and operation of our flexible chute, and while we have endeavored to set forth the best embodiments thereof, we desire to have it understood that obvious changes may be made within the scope of the following claims without departing from the spirit of our invention.

We claim:

1. A flexible chute comprising a series of chute sections having relatively narrow transversely extending slots therethrough, and substantially flat T-shaped interlocking elements on each section extending through the slots of the next adjacent section limiting separation of adjacent sections.

2. A flexible chute comprising a series of short chute sections, and interlocking means connecting adjacent sections, said interlocking means including substantially flat T-shaped projecting elements on one section of each pair of adjacent sections, the other section of each said pair including transversely extending narrow slots through which said projecting elements extend.

3. A flexible chute comprising a series of short chute sections, each pair of adjacent sections including flanges on one section of the pair extending in overlapping relation to the other section of the pair, one section of said pair having relatively narrow transversely extending slots therethrough, and substantially flat T-shaped projecting means on the other section extending through said slots and limiting longitudinal movement between said sections of each pair.

4. A flexible chute comprising a series of short chute sections, one section of each adjacent pair of sections having relatively narrow transversely extending slots therethrough, substantially flat T-shaped projecting elements on the other section of each pair extending through said slots, the head of the T of each projecting element being wider than the slot through which said element extends.

5. A flexible chute comprising a series of short sections, each section comprising a strip of sheet material bent into chute formation, a series of ears on one edge of each chute strip designed to engage in overlapping relation with the strip of the next adjacent section, and a series of interlocking elements projecting from said one edge of said strip, flat outwardly offset portions on the opposite edge of said strips, each strip including slots adjacent said outwardly offset portions through which said projecting elements extend, and an end on each interlocking element limiting separation of said sections.

6. A flexible chute comprising a series of short sections each section comprising a strip of sheet material bent into chute formation, a series of ears on one edge of each chute strip designed to engage in overlapping relation with the strip of the next adjacent section, and a series of substantially flat T-shaped interlocking elements projecting from said one edge of said strip, each strip including relatively narrow transversely extending slots through which said projecting elements extend, the head of the T of each said element limiting separation of said sections.

7. A flexible chute comprising a series of short sections, each section comprising a strip of sheet material bent into chute formation, a series of ears on one edge of each strip designed to engage in overlapping relation with the strip of the next adjacent section, a series of substantially T-shaped interlocking elements projecting from the opposite edge of the strip of each section, each section including transverse slots through which the interlocking elements of the next adjacent section extend, the head of the T of each said projecting element limiting separation of said sections.

8. A flexible chute comprising a series of short chute sections each comprising a strip of sheet material bent into chute formation, a series of ears on one edge of each strip designed to overlap the next adjacent strip, a series of interlocking elements projecting from said edge of each strip, outwardly offset portions in said sections adjacent the other edge of each section, each strip including slots adjacent said outwardly offset portions through which the interlocking elements of the next adjacent strip extend, and folded ends on said projecting elements limiting the separation between said sections.

9. A flexible chute comprising a series of short chute sections having slots therein, one or more of said sections including substantially T-shaped interlocking elements projecting from one end thereof, extending through said slots of the next adjacent section, the head of the T of each element limiting separation of said sections, the remaining sections having projecting elements extending through said slots of the next adjacent section, and bent ends on said last named projecting elements holding said last named projecting elements from disengagement with the sections which they engage.

10. A flexible cute comprising a series of chute sections of channel shape, each of said sections having interlocking elements projecting from one edge thereof and lying coplanar with the surface from which they project, off-set portions on the other edge of each of said sections, and slots between said off-set portions and the remainder of said sections through which said interlocking elements of the next adjacent section may project.

11. A flexible chute comprising a series of chute sections of channel shape, each of said sections having interlocking elements projecting from one edge thereof and lying coplanar with the surface from which they project, off-set portions on the other edge of each of said sections, slots between said off-set portions and the remainder of said sections through which said interlocking elements of the next adjacent section may project, and means on the ends of said interlocking elements to hold said ears engaged in said slots.

12. A flexible chute comprising a series of chute sections of resilient sheet material formed in channel shape, each of said sections having interlocking elements projecting from one edge thereof and lying substantially coplanar with the surface from which they project, off-set portions on the other edge of each of said sections, slots between said off-set portions and the remainder of said sections through which said interlocking elements of the next adjacent section may project, said interlocking elements lying inwardly of said off-set portions and outwardly of portions of said sections adjacent said slots, and means on the ends of said interlocking elements holding said interlocking elements engaged in said slots.

13. A flexible chute comprising a series of chute sections of channel shape, each of said sections having interlocking elements projecting from one edge thereof and lying substantially coplanar with the surface from which they project, off-set portions in the other edge of each of said sections, slots between said off-set portions and the remainder of said sections through which the interlocking elements of the next adjacent section may project, and a set of ears on one edge of each of said sections, said set of ears being off-set to overlie a portion of the outer surface of the next adjacent section.

14. A flexible chute comprising a series of chute sections of channel shape, each of said sections having interlocking elements projecting from one edge thereof and lying coplanar with the surface from which they project, off-set portions on the other edge of each of said sections, slots between said off-set portions and the remainder of said sections through which the interlocking elements of the next adjacent section may project, means on the ends of said interlocking elements to hold said interlocking elements engaged in said slots, and a set of ears on one edge of each section, said set of ears being off-set to overlie the outer surface of the next adjacent section.

15. The method of assembling a flexible chute comprised of transverse strips having interlocking elements thereon capable of being interlocked by a transverse movement between adjacent strips; the method consisting of interlocking the strips while in a substantially flat condition by a transverse relative movement between adjacent strips, and bending the strips longitudinally of the chute to prevent further relative transverse movement between adjacent strips to lock the adjacent strips from disengagement.

16. The method of assembling a flexible chute comprised of transverse strips having interlocking elements thereon capable of being interlocked by a transverse relative movement between adjacent strips and having projecting ears thereon overlapping portions of the next adjacent strip; the method consisting of interlocking the strips by a relative transverse movement therebetween, and of folding the strips longitudinally of the chute so that the portions of said strips bearing the ears are in angular relation with an intermediate portion of the chute, the overlapping ears holding adjacent strips from the relative transverse movement necessary to disengage the adjacent strips.

WARREN H. NOBLES.
JOHN E. MILLS.